July 14, 1953 W. H. MYERS 2,645,499

PHONOGRAPH SPINDLE APERTURE REDUCER

Filed March 22, 1949

INVENTOR.
WILLIAM H. MYERS
BY Arthur A. Smith
ATTORNEY

Patented July 14, 1953 2,645,499

UNITED STATES PATENT OFFICE 2,645,499

PHONOGRAPH SPINDLE APERTURE REDUCER

William H. Myers, Fort Wayne, Ind., assignor to Farnsworth Research Corporation, a corporation of Indiana Application March 22, 1949, Serial No. 82,817

1 Claim. (Cl. 274—42)

This invention relates to phonograph records and is particularly directed to a device for reducing the size of an abnormally large spindle aperture.

Heretofore, phonograph records have been manufactured with a standard turntable spindle aperture of approximately one-quarter inch. Many of the conventional automatic phonograph mechanisms utilize the spindle for supporting a stack of unplayed records above the turntable and upon actuation of a control mechanism, the records are singly released from the spindle and guided down onto a turntable for reproduction. Thus, there are now in use a large number of phonographs having a standard size spindle for playing only records having an aperture of standard size.

At the present time, records are being manufactured with an oversize spindle aperture which is adapted to be played with a phonograph mechanism having an oversized spindle. In view of the particular design of this new record, it is evident that conventional phonograph mechanisms are incapable of playing them. This is particularly true of phonographs which utilize the spindle for supporting the unplayed records.

Accordingly, it is the principal object of this invention to provide a novel attachment for phonograph records having oversized spindle apertures thereby to adapt such records for playing on phonographs having spindles of standard size.

Another object of this invention is to provide an attachment for phonograph records which is adapted to prevent slippage of records with respect to a phonograph turntable when the tone arm is tracking them.

In accordance with the invention there is provided a device adapted to be detachably secured to an abnormally large spindle aperture of a phonograph record. The device comprises an annular member including a normal size spindle aperture and means around the peripheral edge surface thereof for detachably securing said device within said abnormal aperture. In accordance with another feature of this invention, frictional means are provided on the device for preventing slippage of records when a tone arm is tracking them.

For a better understanding of the invention, together with other and further objects thereof, reference is made to the following description, taken in connection with the accompanying drawing, and its scope will be pointed out in the appended claim.

Figure 1:
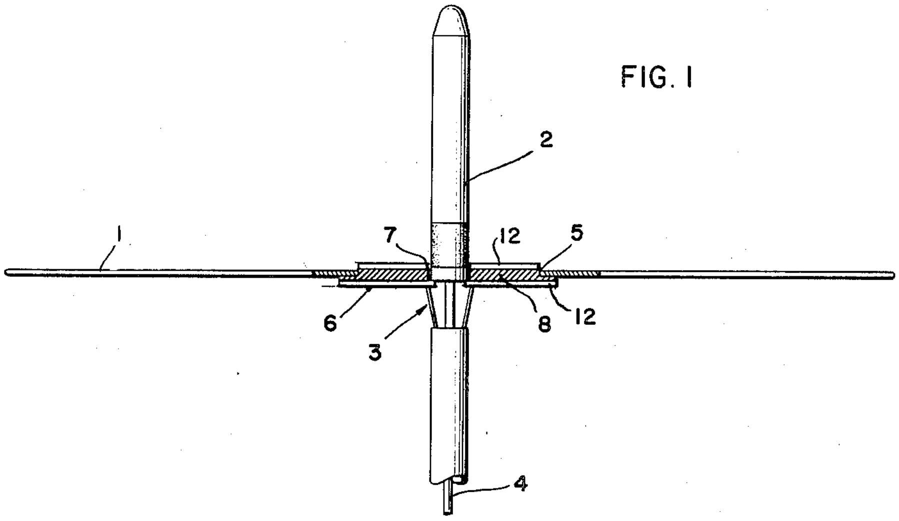
Fig. 1 is a sectional view of the aperture-reducing device secured to a phonograph record and shown in operative position on the spindle of a phonograph apparatus.
Figure 2:
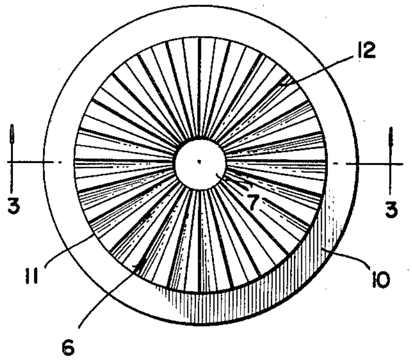
Fig. 2 is an enlarged top plan view of the device illustrated in Fig. 1.
Figure 3:
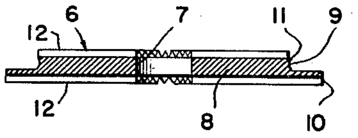
Fig. 3 is a sectional view of the device taken on line 3—3 of Fig. 2.

Referring now to Fig. 1, there is illustrated a phonograph record 1 mounted on a turntable spindle 2 having a self-contained record supporting and releasing mechanism 3 connected through rod 4 to an operating mechanism (not shown).

The record is shown with an oversized aperture 5 in which is detachably inserted a relatively thick insert 6, having a thickness somewhat greater than the thickness of the record 1, and having a centrally disposed aperture 7 of standard size adapted to be threaded on the spindle 2. The insert may be formed of suitable plastic material. The insert comprises a plug 8 having three portions: an annular grooved central portion 9 connecting an annular lower flange portion 10 and an upper lip portion 11. The flange portion 10 has a diameter substantially greater than the diameter of the aperture of the record and the lip portion 11 has a diameter slightly larger than the diameter of the aperture of the record. The groove portion 9 has a diameter substantially equal to the diameter of the aperture of the record. The lip portion is comparatively thin and therefore has a small degree of resilience. To insert the plug 8 in the aperture of the record the lip portion 11 is compressed against the side of the record aperture 5 and after passing through the record aperture expands to its normal size. Thus, the record is firmly held between the lower flange portion 10 and the lip portion 11. It will be seen that the flange portion 10 serves to support the record when the record and the plug 8 are threaded on the spindle 2 and supported by the supporting mechanism 3.

To remove the plug 8, pressure is applied to the top portion of the plug and the lip portion 9 is again compressed by the side of the record aperture and after clearing the side thereof, the lip portion expands back into its original shape.

It is to be observed that the upper and lower face surfaces of the plug project slightly above the plane of the body portion of the record. Each of the surfaces is provided with serrations 12 for frictionally engaging with opposite faces of other inserts or records to prevent records which are stacked on a turntable from slipping over one another when the tone arm is tracking them. Instead of providing serrations, it is conceivable that each face surface could be provided with felt material.

From the description, it is evident that there is illustrated a device for phonograph records that has novel features. For example, the structure of the device is such that it can readily be attached to records having an abnormally large spindle aperture to permit their use with standard turntable spindles of conventional phonograph mechanisms. Thus, the operator may utilize any type of record regardless of aperture size with conventional phonograph mechanisms. It is also to be noted that the device is provided with an integral record-gripping means whereby records are prevented from slipping when the tone arm is tracking them, thereby insuring faithful reproduction of a record.

It is apparent that the invention may be embodied in other specific forms without departing from the spirit or essential attributes thereof, and it is desired, therefore, that the embodiments disclosed herein be considered in all respects as illustrative, reference being had to the appended claim for a determination of the scope of the invention.

What is claimed is:

A device for reducing the size of an abnormally large spindle aperture of a disc-shaped phonograph record to the standard size spindle, comprising an annular member having an aperture at the center thereof, said aperture having a diameter slightly larger than the diameter of a standard-sized spindle, the peripheral wall of said member comprising an integral lower, laterally extending flanged portion having a diameter substantially greater than the aperture of the record, an integral upper laterally extending lip-portion having a diameter slightly larger than the aperture of the record and having a small degree of resilience, and a central portion connecting said upper and said lower portions, said central portion having a diameter substantially equal to the diameter of the aperture of the record, and a width substantially equal to the thickness of the record, said member adapted to be removably inserted in the aperture of said record by the compression of said upper portion against the side of the aperture of the record.

WILLIAM H. MYERS.

References Cited in the file of this patent

UNITED STATES PATENTS

| Number | Name | Date |
|---|---|---|
| 832,403 | Melans | Oct. 2, 1906 |
| 1,253,374 | Hansen | Jan. 15, 1918 |
| 1,755,743 | Morrison | Apr. 22, 1930 |
| 2,187,296 | Appel | Jan. 16, 1940 |
| 2,501,465 | Caramanoff | Mar. 21, 1950 |

FOREIGN PATENTS

| Number | Country | Date |
|---|---|---|
| 124,508 | Austria | Sept. 25, 1931 |
| 725,759 | France | May 18, 1932 |
| 735,808 | France | Nov. 16, 1932 |
| 63,231 | Denmark | Mar. 5, 1945 |